United States Patent
Jeon et al.

(10) Patent No.: US 9,188,802 B2
(45) Date of Patent: Nov. 17, 2015

(54) DISPLAY DEVICE INTEGRATED WITH TOUCH SCREEN

(75) Inventors: Byeong Kyu Jeon, Busan-si (KR); Jung Mok Park, Hwaseong-si (KR)

(73) Assignee: Samsung Display Co., Ltd., Yongin-si (KR)

(*) Notice: Subject to any disclaimer, the term of this patent is extended or adjusted under 35 U.S.C. 154(b) by 24 days.

(21) Appl. No.: 13/244,283

(22) Filed: Sep. 24, 2011

(65) Prior Publication Data

US 2012/0154725 A1 Jun. 21, 2012

(30) Foreign Application Priority Data

Dec. 15, 2010 (KR) ........................ 10-2010-0128420

(51) Int. Cl.
*G02F 1/1333* (2006.01)
*G02F 1/1362* (2006.01)
*G06F 3/041* (2006.01)
*G06F 3/044* (2006.01)

(52) U.S. Cl.
CPC ...... *G02F 1/13338* (2013.01); *G02F 1/136209* (2013.01); *G06F 3/044* (2013.01); *G06F 3/0412* (2013.01)

(58) Field of Classification Search
CPC .................................................. G02F 1/13338
USPC .......................................... 349/110; 345/173
See application file for complete search history.

(56) References Cited

U.S. PATENT DOCUMENTS

| | | | |
|---|---|---|---|
| 7,088,405 B2* | 8/2006 | Kotchick et al. | 349/114 |
| 2001/0040800 A1* | 11/2001 | Carpenter et al. | 362/166 |
| 2003/0071796 A1* | 4/2003 | Nakanishi et al. | 345/173 |
| 2003/0095219 A1* | 5/2003 | Lee | 349/110 |
| 2004/0223099 A1* | 11/2004 | Kotchick et al. | 349/114 |
| 2005/0186408 A1* | 8/2005 | Condo et al. | 428/212 |
| 2005/0237448 A1* | 10/2005 | Wu et al. | 349/106 |
| 2006/0214925 A1* | 9/2006 | Taninaka et al. | 345/173 |
| 2006/0274241 A1* | 12/2006 | Maeda et al. | 349/114 |
| 2007/0013819 A1 | 1/2007 | Pak et al. | |
| 2008/0048996 A1* | 2/2008 | Hu et al. | 345/174 |
| 2008/0157065 A1* | 7/2008 | Krishnamoorthy et al. | 257/40 |
| 2009/0079917 A1* | 3/2009 | Pan | 349/110 |
| 2009/0096760 A1* | 4/2009 | Ma et al. | 345/174 |
| 2009/0135151 A1* | 5/2009 | Sun | 345/173 |
| 2009/0147167 A1* | 6/2009 | Park | 349/40 |
| 2009/0207151 A1 | 8/2009 | Liu et al. | |
| 2009/0257010 A1* | 10/2009 | Sakurai | 349/110 |
| 2009/0277695 A1* | 11/2009 | Liu et al. | 178/18.03 |

(Continued)

FOREIGN PATENT DOCUMENTS

| | | |
|---|---|---|
| JP | 2007-025669 | 2/2007 |
| JP | 2009-271662 | 11/2009 |
| KR | 1020070008743 A | 1/2007 |

*Primary Examiner* — Michael Caley
*Assistant Examiner* — Edmond Lau
(74) *Attorney, Agent, or Firm* — Christie, Parker & Hale, LLP

(57) ABSTRACT

A flat panel display device integrated with a touch screen is provided. The flat panel display device includes a substrate, a black matrix, and a color decoration layer. The substrate includes an active region, and an inactive region surrounding the active region. The black matrix is provided on the substrate in the inactive region. The color decoration layer is provided under the substrate in a position corresponding to the black matrix. The color decoration layer is formed by alternately stacking a material having a low refractive index and a material having a high refractive index.

20 Claims, 2 Drawing Sheets

(56) References Cited

U.S. PATENT DOCUMENTS

| | | | |
|---|---|---|---|
| 2009/0284487 A1* | 11/2009 | Nakanishi et al. | 345/173 |
| 2010/0079384 A1* | 4/2010 | Grivna | 345/173 |
| 2010/0085512 A1* | 4/2010 | Ueda et al. | 349/68 |
| 2010/0173134 A1* | 7/2010 | Khokhlov et al. | 428/174 |
| 2010/0182267 A1* | 7/2010 | Lee et al. | 345/173 |
| 2012/0113032 A1* | 5/2012 | Itakura et al. | 345/173 |

* cited by examiner

DISPLAY DEVICE INTEGRATED WITH TOUCH SCREEN

CROSS-REFERENCE TO RELATED APPLICATION

This patent application claims priority to and the benefit of Korean Patent Application No. 10-2010-0128420, filed on Dec. 15, 2010, in the Korean Intellectual Property Office, the entire content of which is herein incorporated by reference.

BACKGROUND

1. Field

The present disclosure herein relates to a flat panel display device integrated with a touch screen, and more particularly, to a flat panel display device integrated with a touch screen, which is integrated with a window and has a color decoration.

2. Description of Related Art

Touch screen panels are input devices that allow a user's command to be inputted by selecting indication content displayed on a screen such as an image display device by hand of the user or object. For this, the touch screen panels are disposed in the front faces of the image display devices and convert a touch position, which is directly touched by the user's hand or an object controlled by the user, into an electrical signal. Therefore, indication content selected in the touch position is recognized as an input signal. Since such touch screen panels may replace separate input devices that are connected to the image display devices and operate like keyboards and mouses, their application fields are increasingly being expanded.

Resistive touch screen panels, light sensing touch screen panels and capacitive touch screen panels are types of the touch screen panels. Among these, the capacitive touch screen panels sense the change of a capacitance that is formed by a conductive sensing pattern with another peripheral sensing pattern or a ground electrode when a user's hand or an object is touched thereto, thereby converting a touch position into an electrical signal.

SUMMARY

An aspect of an embodiment of the present invention is directed toward a flat panel display device integrated with a touch screen, which is integrated with a window and enables a color decoration. Accordingly, the flat panel display device can be thinned, and a transmittance can be prevented from being decreased.

An embodiment of the present invention provides a flat panel display device integrated with a touch screen including: a substrate including an active region, and an inactive region surrounding the active region; a black matrix provided on the substrate in the inactive region; and a color decoration layer provided under the substrate in a position corresponding to the black matrix, wherein the color decoration layer is formed by alternately stacking a low refractive index material and a high refractive index material having higher refractive index than that of the low refractive index material.

In one embodiment, an optical distance of the color decoration layer may be an integer multiple of any one half-wavelength of a specific light which to be reflected by the color decoration layer.

In one embodiment, the low refractive index material is silicon dioxide ($SiO_2$), and the high refractive index material is titanium dioxide ($TiO_2$).

In one embodiment, the black matrix is formed of a resin.

In one embodiment, the flat panel display device further includes an anti-reflection coating layer provided between the substrate and the color decoration layer.

In one embodiment, the flat panel display device further includes: a metal line disposed on the black matrix; and a plurality of sensing patterns connected to the metal line, and disposed in the active region.

In one embodiment, the sensing patterns are formed of indium tin oxide (ITO).

In one embodiment, the flat panel display device includes an overcoat layer covering the black matrix, on the substrate, wherein the metal line and the sensing patterns are disposed on the overcoat layer.

In one embodiment, the sensing patterns include: a plurality of first sensing patterns formed to be connected in a first direction; and a plurality of second sensing patterns separated from the first sensing patterns, and formed to be connected in a second direction crossing the first direction.

In one embodiment, the first sensing patterns include: a plurality of first conductive patterns; and a plurality of first bridge patterns connecting the first conductive patterns.

In one embodiment, the second sensing patterns include: a plurality of second conductive patterns; and a plurality of second bridge patterns connecting the second conductive patterns.

In one embodiment, the flat panel display device further includes an insulation layer pattern provided on the first bridge patterns, wherein the second bridge patterns are disposed on the insulation layer pattern.

In one embodiment, the flat panel display device further includes a ground line separated from the metal line, and disposed on the black matrix.

In one embodiment, the flat panel display device further includes a plurality of conductive line patterns comprising: a first conductive line pattern provided between the metal line and the overcoat layer; and a second conductive line pattern provided between the ground line and the overcoat layer, wherein the conductive line patterns electrically connect the metal line with the sensing patterns.

In one embodiment, at least one of the sensing patterns, the metal line or the ground line is formed of graphene.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Figure 1:
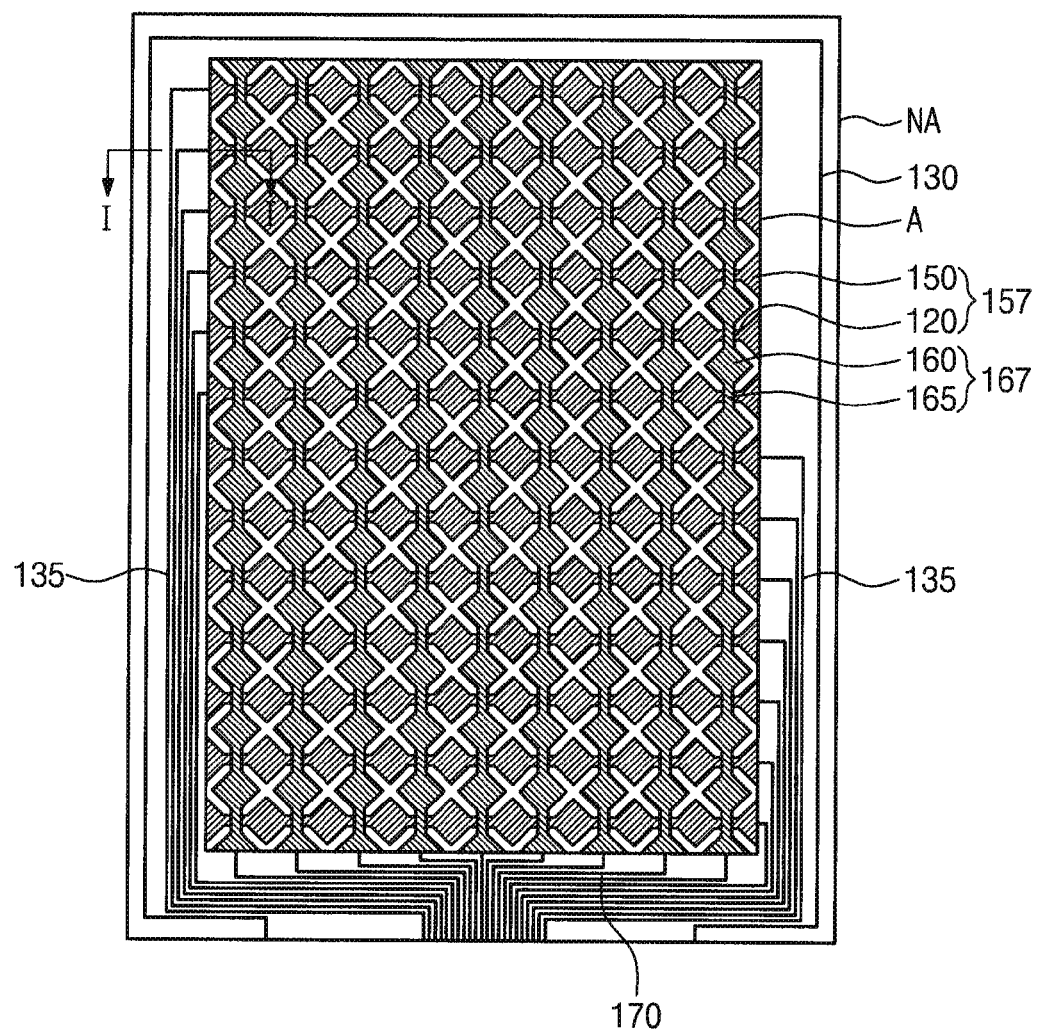
FIG. 1 is a plan view illustrating a flat panel display device integrated with touch screen according to an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout.

Figure 2:
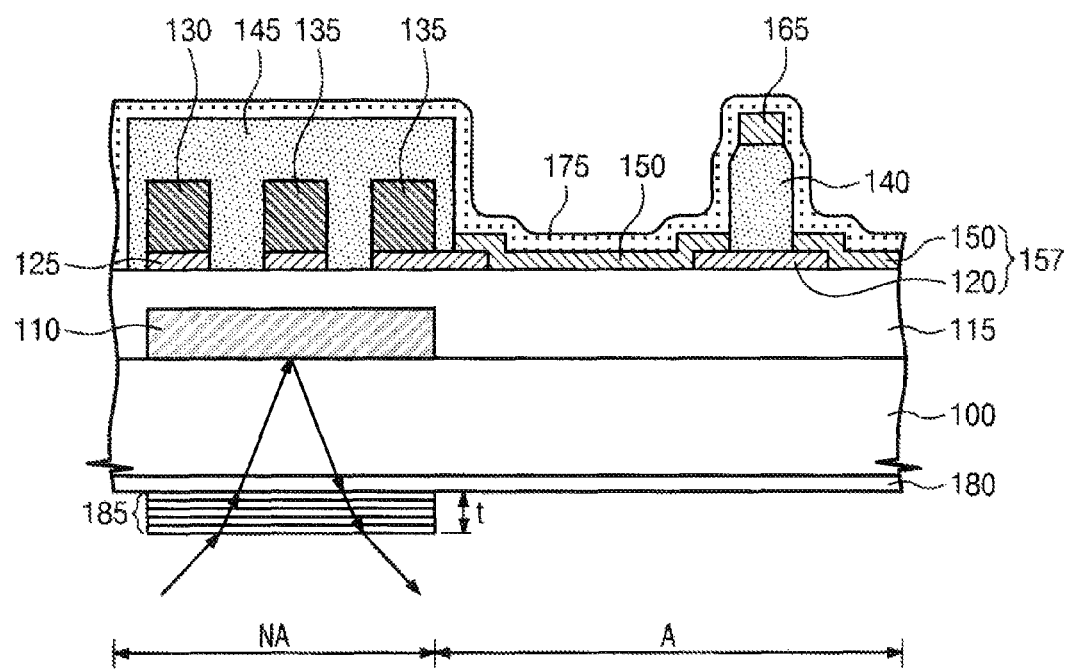
FIG. 2 is an enlarged view of a cross-sectional surface taken along line A-A' of FIG. 1.

FIG. 1 is a plan view illustrating a flat panel display device integrated with touch screen according to an embodiment of the present invention. FIG. 2 is an enlarged view of a cross-sectional surface taken along line A-A' of FIG. 1.

Referring to FIGS. 1 and 2, a flat panel display device integrated with touch screen, according to an embodiment of the present invention, may include a substrate 100. Here, a black matrix 110, an overcoat layer 115, a plurality of first sensing patterns 157, a first insulation layer pattern 140, and a plurality of second sensing patterns 167 are provided on one the substrate 100 (i.e., provided on one side of the substrate 100); and a color decoration layer 185 is provided under the substrate 100 (i.e., provided on (under) another side of the substrate).

The substrate 100 includes an active region A, and an inactive region NA surrounding the active region A. The substrate 100 may be formed of a transparent material. For example, the substrate 100 may be formed of a glass. The bottom surface of the substrate 100 may be a portion that may be touched by a user's hand or an object.

The black matrix 110 may be provided on the substrate 100 in the inactive region NA. The black matrix 110 prevents leakage of light, and may be formed in a closed loop shape along the edge of the active region A. The black matrix 110 may be formed of an organic material. For example, the black matrix 110 may be formed of a resin. A region including the black matrix 110 may have a decoration or a logo.

The overcoat layer 115 may be provided on the substrate 100 to cover the black matrix 110. The overcoat layer 115 may cover the entire top of the substrate 100. The overcoat layer 115 may provide a flat top. The overcoat layer 115 may be formed of an organic material.

The first sensing patterns 157 may be provided on the overcoat layer 115 in the active region A, and formed to be connected in a first direction (for example, an X direction) for serving as a sensing electrode. The first sensing patterns 157 may include first conductive patterns 150, and first bridge patterns 120 that electrically connect the first conductive patterns 150. As an example, the first sensing patterns 157 may be arranged to have about fifteen to twenty individual patterns 157 in one row.

For example, as illustrated in FIG. 1, the first conductive patterns 150 may each have a diamond shape. The first bridge patterns 120 may each have a rectangular bar shape having a width narrower than that of the first conductive patterns 150. The first conductive patterns 150 and the first bride patterns 120 may be formed of a transparent conductive material. For example, the first conductive patterns 150 and the first bridge patterns 120 may be formed of indium tin oxide (ITO) or graphene.

The first insulation layer pattern 140 may be formed on the first bridge patterns 120. For example, the first insulation layer pattern 140 may be formed of an organic material.

The second sensing patterns 167 may be provided on the first insulation layer pattern 140 and the overcoat layer 150 in the active region A, and formed to be connected in a second direction (for example, a Y direction) intersecting (crossing) the first sensing patterns 157 for the purpose of serving as a sensing electrode. The second sensing patterns 167 are disposed so as not to electrically be connected to the first sensing patterns 157. That is, the first sensing patterns 157 and the second sensing patterns 167 are separated from each other by the first insulation layer pattern 140.

The second sensing patterns 167 may include second conductive patterns 160, and second bridge patterns 165 that electrically connect the second conductive patterns 160. The second bridge patterns 165 are disposed on the first insulation layer pattern 140. Herein, the second bridge patterns 165 may be integrated with the second conductive patterns 160. As an example, the second sensing patterns 167 may be arranged to have about fifteen to twenty individual patterns 167 in one row.

For example, as illustrated in FIG. 1, the second conductive patterns 160 may each have a diamond shape. Unlike this, the second conductive patterns 160 may have various suitable shapes. The second bridge patterns 165 may each have a rectangular bar shape having a width narrower than that of the second conductive patterns 160.

The second conductive patterns 160 and the second bride patterns 165 may be formed of a transparent conductive material. For example, the second conductive patterns 160 and the second bride patterns 165 may be formed of ITO or graphene.

The first conductive patterns 150 and the second conductive patterns 160 are alternately disposed on the same plane so as not to overlap with each other. The first bride patterns 120 intersect (cross) the second bridge patterns 165 of the second sensing patterns 167. The first insulation layer pattern 140 is provided between the first bride patterns 120 and the second bridge patterns 165.

A plurality of first metal lines 135 and second metal lines 170, which connect a position detection line with the first sensing patterns 157 and the second sensing patterns 167, are disposed on the overcoat layer 115 corresponding to the black matrix 110. The first metal lines 135 and the second metal lines 170 may be formed of a metal or graphene. The first metal lines 135 may transfer the capacitance change of the first sensing patterns 157 to the position detection line. The second metal lines 170 may transfer the capacitance change of the second sensing patterns 167 to the position detection line.

For example, the first metal lines 135 may be disposed at both side portions of the inactive region NA. As an example, as illustrated, the first metal lines 135 may be divided into groups and respectively disposed at one side portion and at the other side portion of the inactive region NA. Unlike this, the first metal lines 135 may be divided into an even group and an odd group, which in case one of the even and odd groups may be disposed at the one side portion of the inactive region NA and the other may be disposed at the other side portion of the inactive region NA. In a structure that connects the position detection line with the first sensing patterns 157 of one row, the arrangement of the first metal lines 135 is not particularly limited thereto. The second metal lines 170 may be disposed in the inactive region NA adjacent to the position detection line.

In a region corresponding to the black matrix 110 in the inactive region NA, a ground line 130 may be further disposed to surround a portion of the first metal lines 135 and a portion of the second metal lines 170 and be separated from the first metal lines 135 and the second metal lines 170. The ground line 130 may be formed of a conductive material, for example, a metal or graphene. The ground line 130 may protect from the effect caused by external static electricity.

For example, the first metal lines 135, the second metal lines 170, and the ground line 130 may be disposed on conductive line patterns 125. Herein, the conductive line patterns 125 and the first bridge patterns 120 may be disposed on the same plane, and the conductive line patterns 125 may be formed of the same material as that of the first bridge patterns 120. At a boundary between the active region A and the inactive region NA, the conductive line patterns 125 may electrically connect the first metal lines 135 with the first sensing patterns 157, and connect the second metal lines 170 with the second sensing patterns 167.

A second insulation layer pattern 145 may be formed on the first metal lines 135, the second metal lines 170, and the ground line 130. The second insulation layer pattern 145 may be formed of the same material as that of the first insulation layer pattern 140.

An insulation layer 175 may be further provided on the first sensing patterns 157, the second sensing patterns 167 and the second insulation layer pattern 145. For example, the insulation layer 175 may be formed of an inorganic material. For example, the inorganic material may be silicon dioxide ($SiO_2$). The insulation layer may serve as a passivation layer.

An anti-reflection coating layer 180 may be further disposed under the substrate 100 for lowering reflectivity of the active region A and enhancing transmissivity thereof. In one embodiment, the anti-reflection coating layer 180 is not provided.

The color decoration layer 185 may be provided under the substrate 100 corresponding to the black matrix 110, and formed as multi layers in which a material having a low refractive index and a material having a high refractive index are alternately stacked. For example, the material having the low refractive index may be $SiO_2$, and the material having the high refractive index may be titanium dioxide ($TiO_2$).

The optical distance 't' of the color decoration layer 185 is the same as the sum of the optical thicknesses of the layers that are included in the color decoration layer 185. The optical thicknesses of the layers correspond to the sum of the multiplications of the refractive indexes and geometric thicknesses of the respective layers.

When it is assumed that the peak wavelength of specific light to be reflected by the color decoration layer 185 is represented by $\lambda$, the optical distance 't' is an integer multiple of $\lambda/2$. The optical distance 't' reflects only a specific wavelength, and thus the flat panel display device integrated with touch screen having color of the wavelength can be implemented. Herein, the optical distance 't' of the color decoration layer 185 can be easily controlled by controlling the thicknesses of the respective layers of the color decoration layer 185.

Although not shown, a display panel may be further provided on the insulation layer 175, and an adhesive layer that adheres the insulation layer 175 to the display panel may be further provided on the insulation layer 175. The display panel may be a liquid crystal panel or an organic light emitting panel. The adhesive layer may be formed of an Anti-Shatter Film (ASF) or an Optical Clear Adhesive (OCA) film.

According to an embodiment of the present invention, the color decoration layer 185, in which the material having the low refractive index and the material having the high refractive index are alternately stacked, is formed under the substrate 100 corresponding to the black matrix 110, and thus decoration of the inactive region NA can be made in a desired color without adhering a window sheet. Accordingly, the existing thick window sheet is not needed (or not provided), and thus, the flat panel display device integrated with touch screen can be thinned and a transmittance can be prevented from decreasing.

In the flat panel display device integrated with touch screen, according to an embodiment of the present invention, the color decoration layer (that includes multiple layers having different refractive indexes) is formed under the substrate corresponding to the black matrix and reflects only a specific wavelength, thereby realizing the color decoration having the color of the specific wavelength. Also, in the flat panel display device integrated with touch screen, according to an embodiment of the present invention, since the color decoration layer replaces the existing thick window sheet, the flat panel display device can be thinned, and a transmittance can be prevented from being decreased.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A display device integrated with a touch screen, comprising:
    a substrate comprising an active region, and an inactive region surrounding the active region;
    a black matrix provided on the substrate in a portion of the inactive region; and
    a color decoration layer provided under the substrate entirely within the inactive region and entirely within a matrix region defined by a projection of the black matrix onto a plane of the substrate in a direction normal to the plane of the substrate,
    wherein the color decoration layer is formed by alternately stacking a low refractive index material and a high refractive index material having higher refractive index than that of the low refractive index material, and
    the color decoration layer is adapted to reflect only a specific wavelength and has a color corresponding to the specific wavelength.

2. The display device of claim 1, wherein an optical distance of the color decoration layer is an integer multiple of any one half-wavelength of a specific light to be reflected by the color decoration layer.

3. The display device of claim 1, wherein the low refractive index material is silicon dioxide ($SiO_2$), and the high refractive index material is titanium dioxide ($TiO_2$).

4. The display device of claim 1, wherein the black matrix is formed of a resin.

5. The display device of claim 1, further comprising an anti-reflection coating layer between the substrate and the color decoration layer.

6. A display device integrated with a touch screen, comprising:
    a substrate comprising an active region, and an inactive region surrounding the active region;
    a black matrix provided on the substrate in a portion of the inactive region; and
    a color decoration layer provided under the substrate entirely within the inactive region and entirely within a matrix region defined by a projection of the black matrix onto a plane of the substrate in a direction normal to the plane of the substrate,
    a metal line on the black matrix; and
    a plurality of sensing patterns connected to the metal line, and in the active region
    wherein the color decoration layer is formed by alternately stacking a low refractive index material and a high refractive index material having higher refractive index than that of the low refractive index material, and
    the color decoration layer is adapted to reflect only a specific wavelength and has a color corresponding to the specific wavelength.

7. The display device of claim 6, wherein the sensing patterns are formed of indium tin oxide (ITO).

8. The display device of claim 6, further comprising an overcoat layer covering the black matrix, on the substrate,
wherein the metal line and the sensing patterns are on the overcoat layer.

9. The display device of claim 8, further comprising a ground line separated from the metal line, and disposed on the black matrix.

10. The display device of claim 9, further comprising a plurality of conductive line patterns comprising:
a first conductive line pattern between the metal line and the overcoat layer; and a second conductive line pattern between the ground line and the overcoat layer,
wherein the conductive line patterns electrically connect the metal line with the sensing patterns.

11. The display device of claim 9, wherein at least one of the sensing patterns, the metal line or the ground line is formed of graphene.

12. The display device of claim 6, wherein the sensing patterns comprise:
a plurality of first sensing patterns formed to be connected in a first direction; and
a plurality of second sensing patterns separated from the first sensing patterns, and formed to be connected in a second direction crossing the first direction.

13. The display device of claim 12, wherein the first sensing patterns comprise:
a plurality of first conductive patterns; and
a plurality of first bridge patterns connecting the first conductive patterns.

14. The display device of claim 13, wherein the second sensing patterns comprise:
a plurality of second conductive patterns; and
a plurality of second bridge patterns connecting the second conductive patterns.

15. The display device of claim 14, further comprising an insulation layer pattern provided on the first bridge patterns,
wherein the second bridge patterns are on the insulation layer pattern.

16. A touch screen comprising:
a substrate comprising an active region and an inactive region surrounding the active region and having a first surface and an opposite surface opposite to the first surface;
a black matrix provided on the first surface of the substrate in a portion of the inactive region; and
a color decoration layer provided on the opposite surface entirely within the inactive region and entirely within a matrix region defined by a projection of the black matrix onto a plane of the substrate in a direction normal to the plane of the substrate, the color decoration layer configured to reflect a first light among incident lights from the outside and to absorb a second light different from the first light, to represent a color,
wherein the color decoration layer comprises a low refractive index material and a high refractive index material having higher refractive index than that of the low refractive index material, the low refractive index material being alternatively stacked with the high refractive index material, and
the color decoration layer is adapted to reflect only a specific wavelength and has a color corresponding to the specific wavelength.

17. A display device integrated with a touch screen, comprising:
a display panel to display image; and
a touch screen disposed on the display panel,
wherein the touch screen comprises:
a substrate comprising an active region and an inactive region surrounding the active region and having a first surface and an opposite surface opposite to the first surface;
a black matrix provided on the first surface of the substrate in a portion of the inactive region; and
a color decoration layer provided on the opposite surface entirely within the inactive region and entirely within a matrix region defined by a projection of the black matrix onto a plane of the substrate in a direction normal to the plane of the substrate, the color decoration layer being configured to reflect a first light among incident lights from the outside and to absorb a second light different from the first light, to represent a color,
wherein the color decoration layer comprises a low refractive index material and a high refractive index material having higher refractive index than that of the low refractive index material, the low refractive index material being alternatively stacked with the high refractive index material, and
the color decoration layer is adapted to reflect only a specific wavelength and has a color corresponding to the specific wavelength.

18. The display device of claim 1, wherein the color decoration layer comprises at least two layers of the high refractive index material.

19. The display device of claim 1, wherein the color decoration layer comprises at least two layers of the low refractive index material.

20. The display device of claim 1, wherein the color decoration layer comprises at least three layers.

* * * * *